(12) United States Patent
Shepherd et al.

(10) Patent No.: US 12,016,280 B2
(45) Date of Patent: Jun. 25, 2024

(54) LANDSCAPE TIMBER SYSTEM

(71) Applicant: 2by2 Industries, LLC, Edmond, OK (US)

(72) Inventors: Stephen Shepherd, Edmond, OK (US); Jaime Trendle, Edmond, OK (US)

(73) Assignee: 2by2 Industries, LLC, Edmond, OK (US)

( * ) Notice: Subject to any disclaimer, the term of this patent is extended or adjusted under 35 U.S.C. 154(b) by 0 days.

(21) Appl. No.: 17/879,482

(22) Filed: Aug. 2, 2022

(65) Prior Publication Data

US 2024/0040974 A1 Feb. 8, 2024

(51) Int. Cl.
*A01G 9/28* (2018.01)
(52) U.S. Cl.
CPC ...................................... *A01G 9/28* (2018.02)
(58) Field of Classification Search
CPC . A01G 9/122; A01G 13/0237; A01G 13/0293
See application file for complete search history.

(56) References Cited

U.S. PATENT DOCUMENTS

| | | | |
|---|---|---|---|
| 267,420 A | 11/1882 | Greer | |
| 2,046,840 A | 7/1936 | Phillips et al. | |
| 3,287,851 A * | 11/1966 | Henry | A01G 13/0281 47/32 |
| 4,523,405 A * | 6/1985 | Madonia | A01G 9/122 428/192 |
| 4,831,776 A * | 5/1989 | Fritch | A01G 9/28 47/33 |
| 4,905,409 A * | 3/1990 | Cole | A01G 9/28 47/33 |
| 4,976,063 A | 12/1990 | Young | |
| 5,157,867 A * | 10/1992 | Fritch | A01G 9/28 47/33 |
| 5,168,678 A * | 12/1992 | Scott, Jr. | A01G 9/02 47/33 |
| 5,283,994 A | 2/1994 | Callison | |

(Continued)

FOREIGN PATENT DOCUMENTS

| | | | | |
|---|---|---|---|---|
| EP | 0369655 | | 5/1990 | |
| FR | 3104898 A1 | * | 6/2021 | ............. A01G 17/14 |
| WO | WO-2019221729 A1 | * | 11/2019 | ............... A01G 9/28 |

*Primary Examiner* — Monica L Perry
*Assistant Examiner* — Aaron M Rodziwicz
(74) *Attorney, Agent, or Firm* — Edward L. White, PC; Edward L. White

(57) ABSTRACT

An improved landscape timber system including a spike and an adjustable length adapter. In one embodiment of the adjustable length adapter, the adjustable length adapter has one end that is configured to receive an end portion of the landscape timber body for changing the overall length, shortening or elongating, of a landscape timber. Once the adjustable length adapter is fitted onto the landscape timber an aesthetic edge is produced. In one embodiment of the spike, the spike has an adjustable length adapter with a first end, an opposite end, and a plurality of equally radially spaced wings forming an elongated body. The opposite end defines a pointed end for driving into the earth, where the wings of the adjustable length adapter converge toward a common point. The radially spaced wings define a polygonal configuration for improved rigidity of the spike and pointed end.

5 Claims, 9 Drawing Sheets

(56) References Cited

U.S. PATENT DOCUMENTS

| | | | |
|---|---|---|---|
| D346,726 S * | 5/1994 | Scott, Jr. | D8/1 |
| D371,446 S * | 7/1996 | VanDeusen | D25/138 |
| D386,652 S * | 11/1997 | Rimback | D8/382 |
| 5,720,128 A | 2/1998 | Smith et al. | |
| D438,992 S * | 3/2001 | Chrisco | D25/164 |
| 6,418,675 B1 | 7/2002 | Peggs et al. | |
| 6,854,221 B1 * | 2/2005 | Michaels | E02D 29/025 |
| | | | 52/585.1 |
| 6,944,998 B1 * | 9/2005 | King | B44F 9/04 |
| | | | 47/33 |
| 7,159,367 B1 * | 1/2007 | King | A01G 9/28 |
| | | | 47/33 |
| 7,908,792 B2 | 3/2011 | Heighton | |
| D646,532 S * | 10/2011 | Burns | D8/1 |
| 8,056,195 B2 | 11/2011 | Zwier | |
| D710,661 S * | 8/2014 | Lu | D8/1 |
| 8,955,251 B2 | 2/2015 | Topping | |
| 9,043,960 B2 | 6/2015 | Ballard | |
| D749,754 S * | 2/2016 | Cline | D25/164 |
| 9,974,240 B1 * | 5/2018 | Brinner | A01G 9/28 |
| 10,612,207 B1 | 4/2020 | Jordan, IV et al. | |
| 2003/0126807 A1 * | 7/2003 | Daniels | A01G 9/28 |
| | | | 52/102 |
| 2004/0126186 A1 * | 7/2004 | Graber | A01G 9/28 |
| | | | 405/38 |
| 2005/0005511 A1 * | 1/2005 | Sacks | A01G 9/28 |
| | | | 47/33 |
| 2005/0034362 A1 * | 2/2005 | Anderson | A01G 9/28 |
| | | | 47/33 |
| 2005/0193647 A1 | 9/2005 | Jones | |
| 2006/0096169 A1 * | 5/2006 | Love | A01G 9/28 |
| | | | 47/10 |
| 2007/0175163 A1 | 8/2007 | Williams et al. | |
| 2010/0242357 A1 | 9/2010 | Vogler et al. | |
| 2012/0311927 A1 * | 12/2012 | Bolin | A01G 9/28 |
| | | | 47/33 |
| 2014/0130411 A1 * | 5/2014 | Topping | A01G 9/28 |
| | | | 47/66.1 |
| 2017/0233973 A1 * | 8/2017 | Rynberk, Jr. | A01G 9/28 |
| | | | 52/157 |
| 2018/0255714 A1 * | 9/2018 | Brinner | A01G 9/28 |
| 2020/0270835 A1 * | 8/2020 | Morey | A01G 9/28 |
| 2020/0288647 A1 * | 9/2020 | Amrine | E04H 17/009 |
| 2021/0112731 A1 * | 4/2021 | Fischer | A01G 9/28 |
| 2022/0394939 A1 * | 12/2022 | Stackhouse | A01G 9/28 |

* cited by examiner

LANDSCAPE TIMBER SYSTEM

CROSS-REFERENCE TO RELATED APPLICATIONS

None.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood these statements are to be read in this light, and not as admissions of prior art.

The invention generally relates to landscape timbers. In particular, the invention relates to interlocking landscape timbers that link end-to-end with the aid of long spikes that are driven through aligned apertures in the ends of the linked timbers and into the ground. The system may include standard landscape timbers and may further include handicap access ramps and members adapted for seating.

Landscape timbers of the above-described kind are typically used for forming a barrier at an edge or around a perimeter of an area that has a layer of ground-covering material, such as wood chips or the like. For example, children's outdoor play areas frequently have a four to twelve-inch thick layer of wood chips or rubber mulch on the ground to create a shock-absorbing surface for children to land on when jumping or falling from play gyms, swing sets, or other play equipment. In this type of installation, the perimeter of the play area is usually surrounded by a barrier of landscape timbers to contain the ground-covering material within the play area.

The landscape timbers for children's play areas and the like typically are molded plastic. The timbers generally have interlocking end portions that have apertures extending vertically therethrough for receiving a long metal spike. The spike both secures the timbers to one another and to the ground.

Because the spike needs to be rigid enough to be hammered through the earth, resisting torsional force and requires a pointed end that is strong enough to drive through natural obstacles commonly found in the ground, such as rocks or tree roots, without dulling, it is well known that steel is the preferred material for spike used in combination with landscape timbers.

The cost of manufactured steel is ever increasing. As the market share of steel imports increase and availability of the raw material decreases, the price of manufacturing and importing steel spikes increases proportionally. To combat the cost of steel, foreign manufacturers are often the sources for the purchase of steel. Alternatively, for a premium price, an American company can purchase steel from an American manufacturer. Foreign manufacturers have long shipping times often several months with backlogged orders. Therefore, it is desirable to replace the steel used in steel spikes with a material that is more readily available, producible, and cost-effective.

Typically, the spikes are two to three feet long and about three-quarters of an inch in diameter. Furthermore, the spikes are typically cylindrical rod-shaped. Accordingly, the spikes are relatively heavy. The transportation costs associated with steel spikes are proportional to the weight of the product being shipped. Furthermore, steel is nearly six times the weight of plastic. It is desirable to replace steel with a lighter material to reduce shipping costs.

It is well known that steel is a very rigid material. Often when hammering the steel spikes into the ground various natural obstacles are encountered, such as rocks or tree roots. Steel is not flexible enough to deform around these natural obstacles. Steel is a strong material to maintain the tip of the spike and drive through these obstacles without dulling; however, to secure the spikes in place, brute force is often required to penetrate these natural obstacles. It is desirable to use replace steel spikes with an improved spike that is flexible enough to deform around rocks and other solids in the ground, while maintaining its tip.

It is further well known that steel is prone to rusting. Steel spikes as described, used for securing landscape timbers are exposed to environmental factors. The spikes can be coated with a corrosion-resistant shield such as chromium or paint; however, this process increases the overall cost of manufacturing.

Landscape timbers are typically fifty-two inches long, four inches wide, and six to twelve inches high; common heights commercially available are 6, 8, 9, and 12 inches. When out in the field, landscape timbers need to be adjusted to various lengths to conform to their environments—either by shortening or elongating the timber's length. Currently, for the length of a landscape timber to be shortened one end of the landscape timber needs to be cut off in the field to receive an adjustable length adapter. The location of the cut needs to be precise to produce an aesthetic edge. Often it is difficult to produce an aesthetic straight edge when cutting through the irregular shape of a landscape timber. Current art does not provide a method for maintaining a flush appearance when the landscape timber length is adjusted. Therefore, it is desirable for an improved adjustable length adapter that allows the length of the landscape timber to be shortened or elongated, with minimal cutting, while maintaining a flush appearance.

At certain intervals in the system, it may be desirable to install ramps that allow handicap access into, for example, a play area. The ramp preferably has sides that include projections adapted to engage a cooperating projection in an adjacent landscape timber. The ramp can thus be incorporated into the system by spikes penetrating the ramps projections and cooperating landscape timber projections.

Similarly, it may be desirable to install seating in certain locations along the landscape timber system, which seating has been marketed as a "Border Bench" by the applicant and which is the subject of a pending patent application (application Ser. No. 17/322,379 filed on May 17, 2021). The Border Bench integrates into the system engaging with the landscape timber's projections and receiving one or more elongated spikes. The teachings of application Ser. No. 17/322,379 are incorporated herein by reference.

Landscape timbers are manufactured in specific predetermined length. Current art provides the option for the length of the landscape timbers to be reduced, but not elongated. As aforementioned, when out in the field landscape timbers often need to be adjusted. Cutting landscape timbers to elongate increases installation time. Therefore, it is further desired for an improved adjustable length adapter that allows the length of the landscape timber to be elongated without the need for cutting.

For the foregoing reasons, there is a need for an improved spike that is cheaper to manufacture, lighter, and more flexible, and there is a need for an improved adjustable length adapter that allows for the length of the landscape timber to be adjusted while maintaining a flush appearance.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure is generally directed to an improvement that seeks to meet the needs mentioned above. One improvement comprises a molded plastic spike and an adjustable length adapter.

In one embodiment of the molded plastic spike, the spike has an elongated body with a first end, an opposite end, and a plurality of equally radially spaced recessed wings. Each wing has radially outwards facing surfaces that define a polygonal configuration when viewed in a horizontal cross-section for improved rigidity. A head, known to one skilled in the art, is affixed to the first end. The head can be selected from flat, or dome. The opposite end defines a pointed end for driving into the earth, where the wings of the adjustable length adapter converge toward a common point. More specifically, spike is a molded plastic spike. The elongated body of the spike has a first end, an opposite end, and a plurality of equally radially spaced wings. The head for striking the spike, is preferably flat head to provide a flush appearance when hammered into aperture for receiving the spike in a landscape timber.

In one embodiment of the adjustable length adapter, the adjustable length adapter has one end that is configured to receive an end portion of the landscaping timber body. The opposite end of the adjustable length adapter has an aperture for receiving the spike therethrough to secure the adjustable length adapter. The adjustable length adapter envelops part of the landscape timber so that the timber body can be elongated or shortened. The end of the adjustable length adapter configured to receive an end portion of the landscape timber provides for a flush appearance because, given its irregular shape, it is hard to cut uniformly. The adjustable length adapter has a cooperating surface that prevents the adjustable length adapter from rotating about the spike.

Although the landscape timbers are typically manufactured from plastic and steel spikes are common to the industry, molded plastic spikes are not known to one skilled in the art. Molded plastic spikes weigh less, are more flexible, and cost less to manufacture. The molded plastic spike requires less downward striking force to be secured into the ground than the current industry standard, steel spikes. The reduced weight of the molded plastic spikes reduces shipping costs. The increased flexibility allows the molded plastic spikes to deform around solids found in the earth, unlike the steel counterparts. Molded plastic spikes are cheaper to manufacture because the raw material is more readily available.

Prior art provides for the length of landscape timbers to be adjusted in one direction—shortening their standard length—and requires cutting the landscape timber. The improved adjustable length adapter also allows for landscape timbers to be elongated without cutting while providing a flush appearance.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the embodiments without limitation to the claimed subject matter.

BRIEF DESCRIPTION OF THE DRAWINGS

These and other features, aspects, and advantages of the present invention will become better understood with regard to the following description, appended claims, and accompanying drawings where:

DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the" and "said" are intended to mean that there are one or more of the elements. The terms "comprising," "including," "having," and grammatical equivalents thereof are intended to be inclusive and mean that there may be additional elements other than the listed elements.

Moreover, any use of "top," "bottom," "above," "below," other directional terms, and variations of these terms is made for convenience, but does not require any particular orientation of the components.

The term "at least" followed by a number is used herein to denote the start of a range beginning with that number (which may be a range having an upper limit or no upper limit, depending on the variable being defined). For example, "at least 1" means 1 or more than 1.

When in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit 100 mm.

"Landscape timber" refers to a timber body extending longitudinally from a first end to an opposite end and having a bottom face for engaging the ground and an opposite top face, and having opposite sides extending between the top and bottom faces, each of the ends of the timber body defining an aperture for receiving an elongated rod-shaped spike therethrough such that the molded plastic landscape timber can be secured to the ground by driving the spike through the apertures into the ground.

Figure 1:
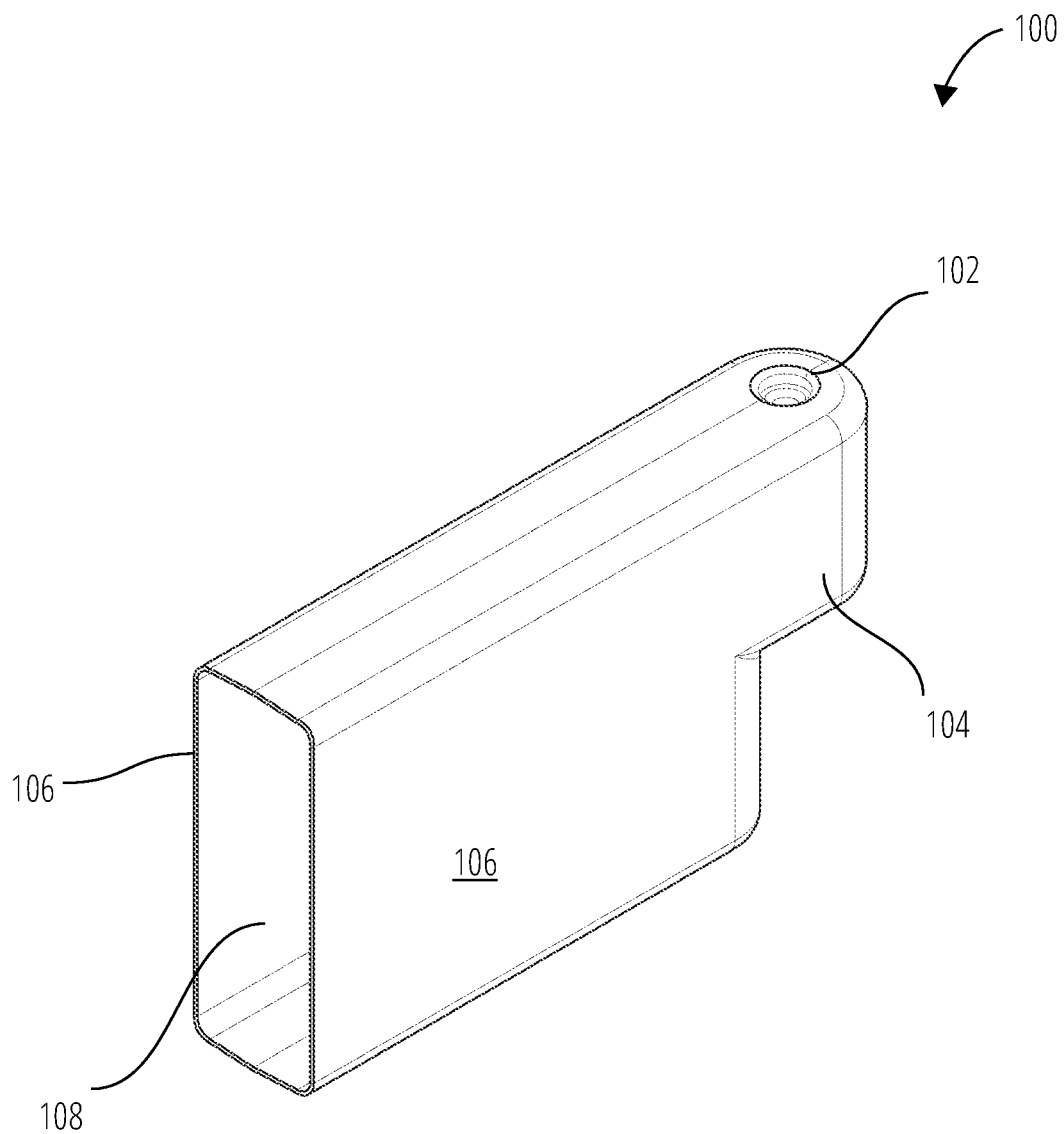
FIG. 1 is a perspective view of the adjustable length adapter.

Turning to the present figures, FIG. 1 a perspective view of the adjustable length adapter 100 is shown. The adjustable length adapter 100 has an open end 108, and an opposite end defining a projection 104. The open end 108 is adapted to engage a portion of a landscape timber. The projection 104 has an aperture 102 therethrough for accepting a spike 900 (FIG. 9) for securing the improved landscape timber system 1200, which will later be described.

The adjustable length adapter 100 has a length less than the standard length of a landscape timber, measured from end to end. In a preferred embodiment, the adjustable length adapter 100 is twenty-four inches long. It will be appreciated that the adjustable length adapter 100 may have different lengths in other embodiments.

The adjustable length adapter 100 is preferably roto-molded plastic; however, as known to one skilled in the art the adjustable length adapter 100 may be manufactured in other ways.

Figure 2:
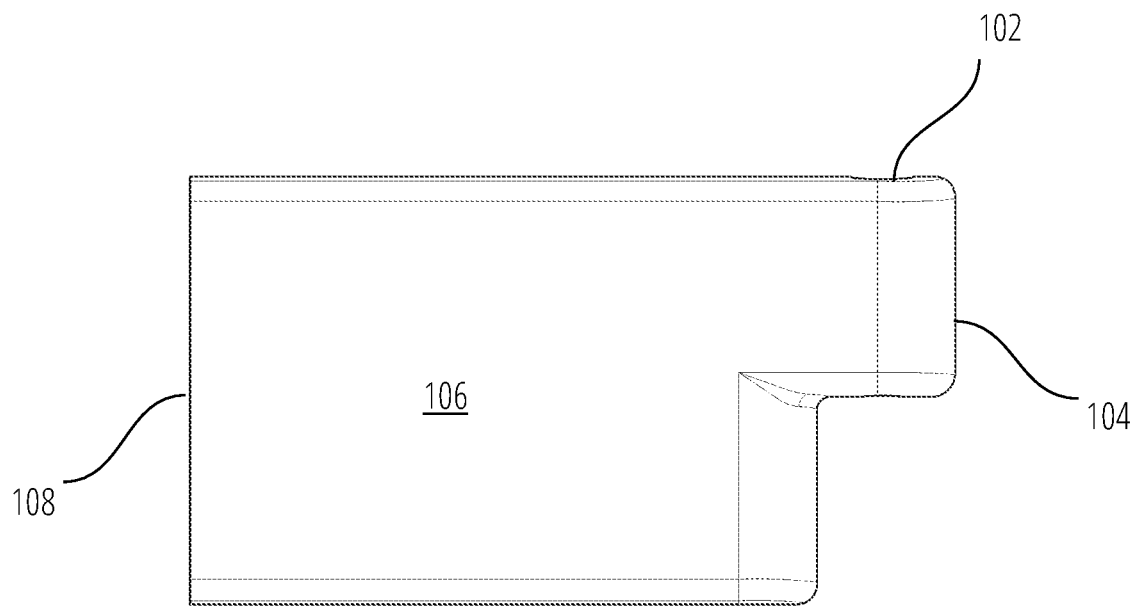
FIG. 2 is a side elevation view of the adjustable length adapter.

FIG. 2 is a side view of the adjustable length adapter 100 featuring the stepped portion defining a projection 104. The projection 104 is shown in the top-step position. The projection 104 is a preferably four inches but may be extended and is typically one-half the overall height of the timber. In other embodiments of the adjustable length adapter 100, the projection 104 may be in the bottom-step position, or in a combined top and bottom position forming a flush edge.

Figure 3:
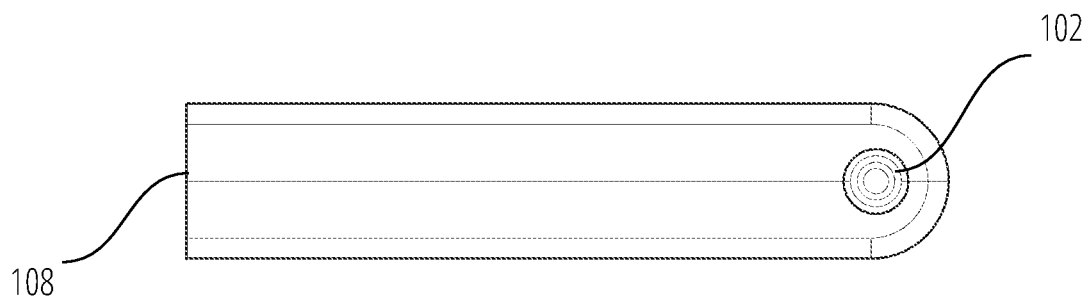
FIG. 3 is a top view of the adjustable length adapter.

FIG. 3 is a top view of the adjustable length adapter 100 showing the aperture 102. It will be appreciated that the aperture 102 for receiving a spike 900, later discussed, can be circular or match the non-circular (for example polygonal) cross section of the spike 900 in other embodiments.

Figure 4:
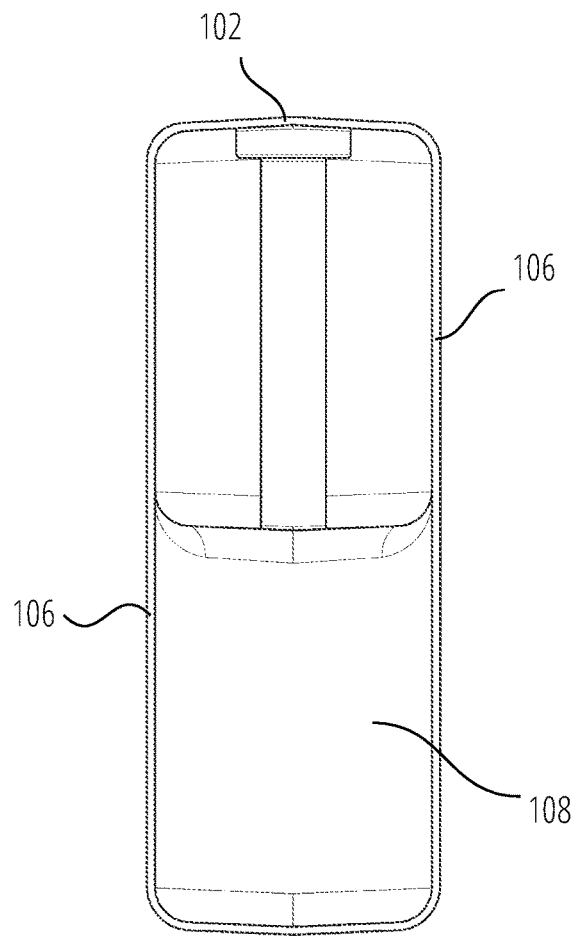
FIG. 4 is a back view of the adjustable length adapter.

FIG. 4 is a back view of the adjustable length adapter 100. It will be appreciated the side walls 106 of the adjustable length adapter 100 can be corrugated or substantially similar to the side walls of a landscape timber for engaging the landscape timber. The corrugation is for forming a more structurally sound engagement with a landscape timber. In FIG. 4, it can be seen that the aperture 102 is preferably shaped to receive the head 902 and body 908 of the spike 900.

Figure 5:
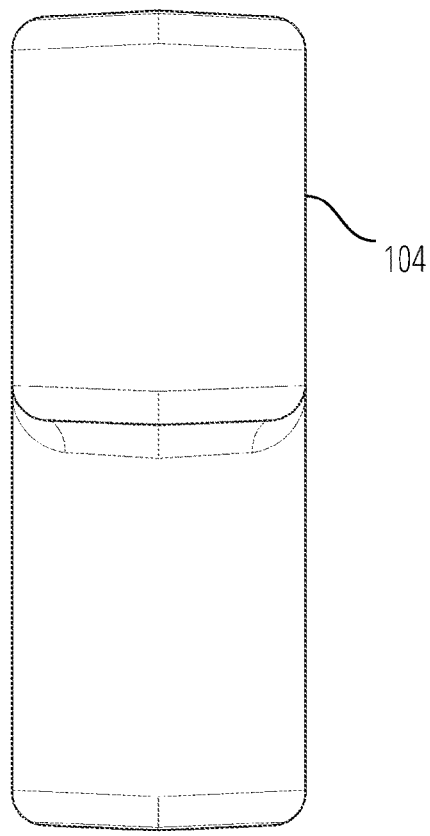
FIG. 5 is a front view of the adjustable length adapter.

FIG. 5 is a front view of the adjustable length adapter 100. The projection 104 is in the top-step position for engaging other landscape timbers. As previously described, in other embodiments, the projection 104 can be in the bottom-step position or in a combined position.

Figure 6:
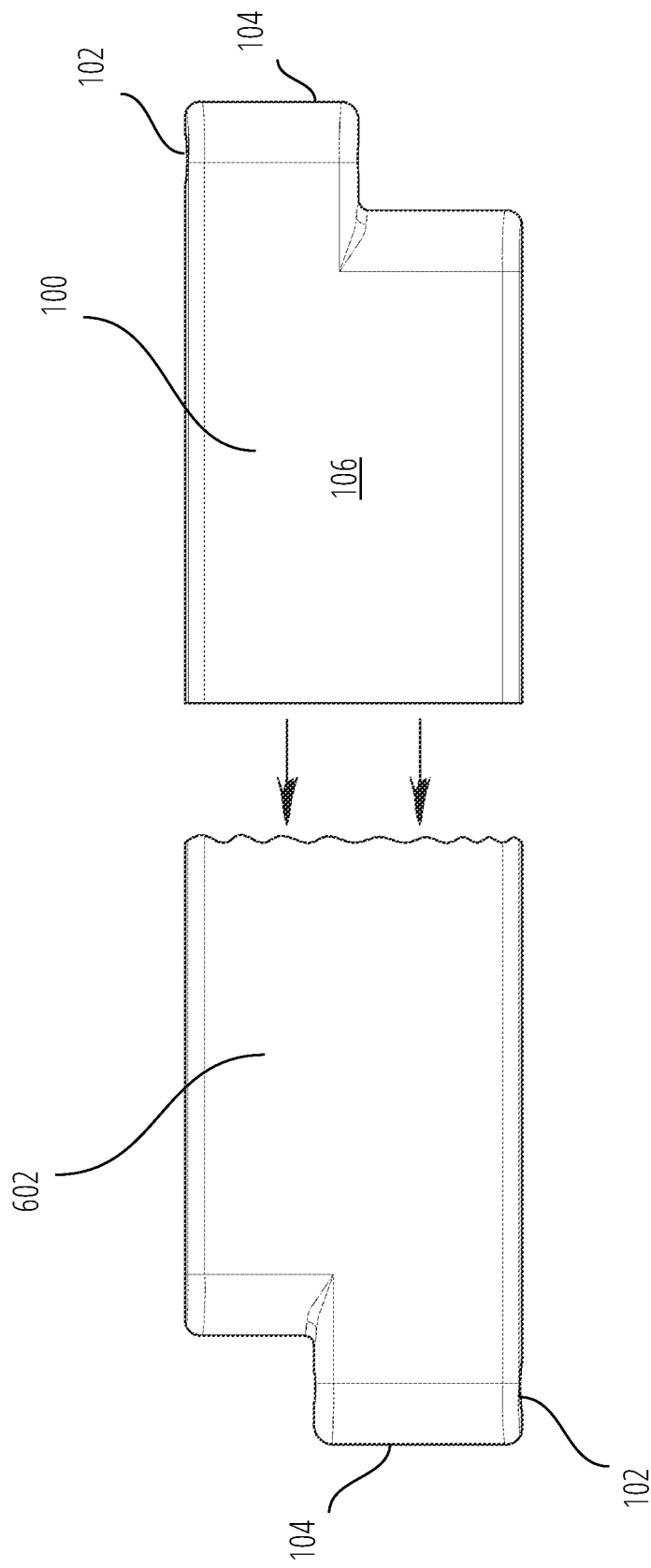
FIG. 6 depicts how the adjustable length adapter engages a landscape timber.
Figure 7:
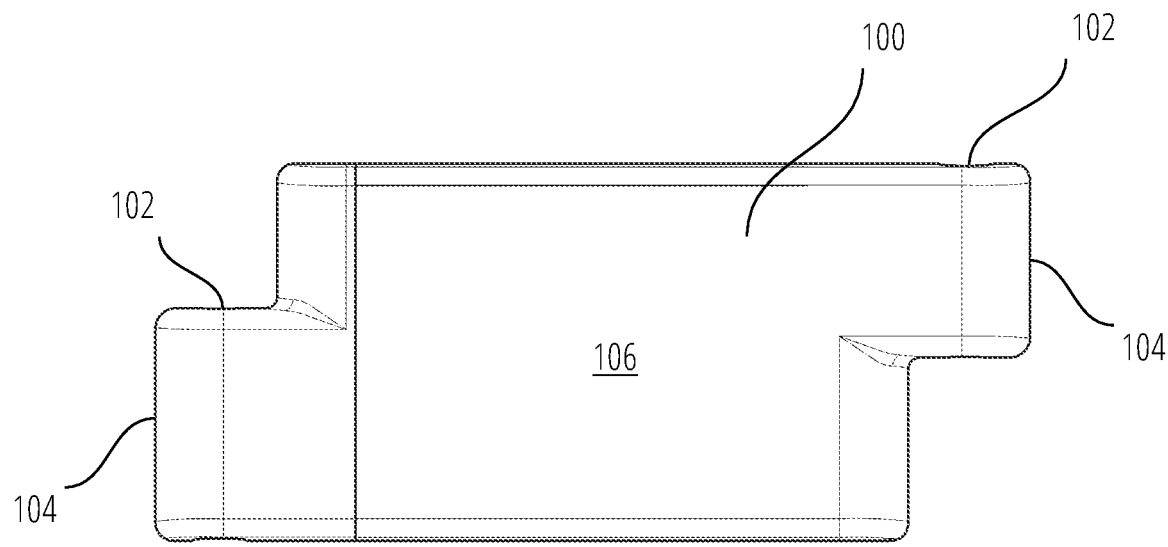
FIG. 7 is the adjustable length adapter engaged with the landscape timber for shortening its standard length.
Figure 8:
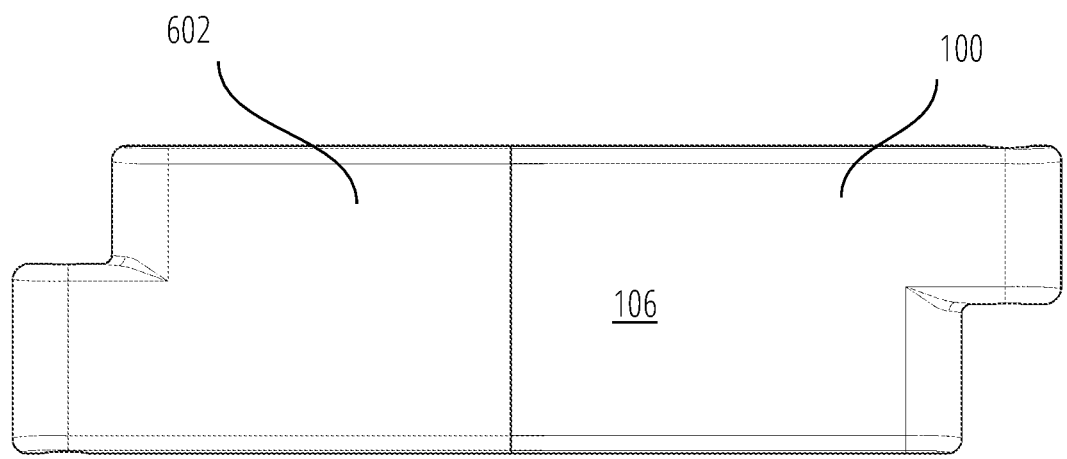
FIG. 8 is the adjustable length adapter engaged with a landscape timber for elongating its standard length.

FIG. 6 generally depicts the adjustable length adapter 100 engaging a landscape timber 602. When the length of a landscape timber 602 needs to be adjusted, the adjustable length adapter 100 is fitted to the landscape timber 602 for the overall length to be elongated without cutting, or shortened, while providing a flush appearance in both cases. FIG. 7 and FIG. 8 illustrate the landscape timber 602 shortened and elongated with the adjustable length adapter 100 respectively. In the event elongation is desired, the landscape timber is not cut, and the adapter 100 is slid onto the timber and adjusted to the desired additional length.

For reducing the length of a landscape timber 602, first, a landscape timber 602 is cut approximately to size. The cut length does not need to be precise, nor aesthetic, because the open end 108 of the adjustable length adapter 100 is fitted onto the newly cut end of the landscape timber 602 and adjusted to the proper length. During fitting process, the adjustable length adapter 100 can be fitted to the proper length. Thereby producing an aesthetic edge once the adjustable length adapter 100 is fitted over the landscape timbers 602. Because only approximate measurement is needed during the fitting process, this reduces the installation time of the system when a landscape timber 602 needs to be shortened.

Similarly, for elongating a landscape timber 602, the open end 108 of the adjustable length adapter 100 is fitted onto an end of the landscape timber 602. The landscape timber 602 can be cut first, but there is no requirement for the landscape timber 602 to be cut. Removing the unnecessary step of cutting reduces the time for installation of the system. Once the adjustable length adapter 100 is fitted onto the landscape timber 602 an aesthetic edge is produced.

Figure 9:
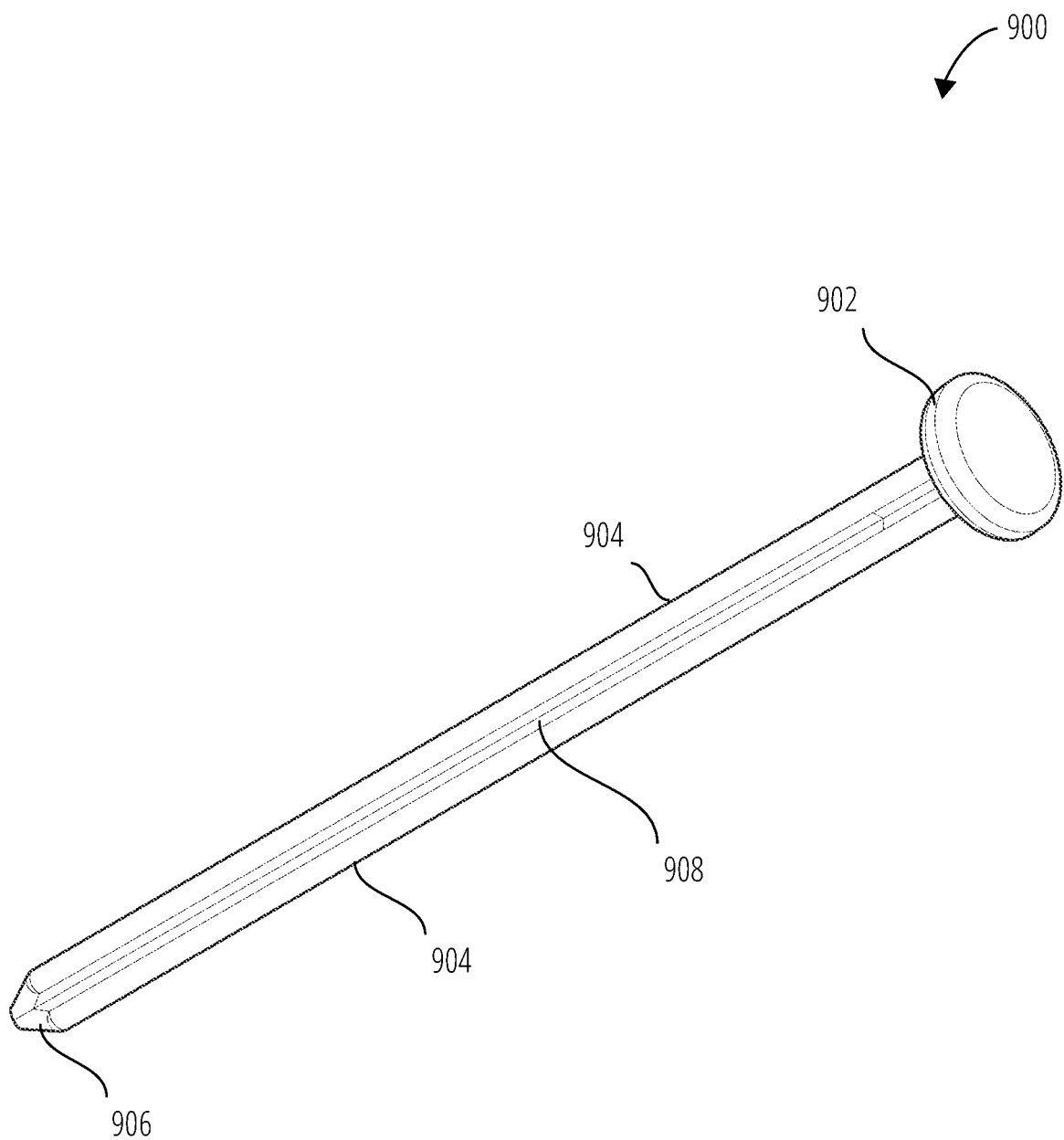
FIG. 9 is a perspective view of the improved spike.
Figure 10:
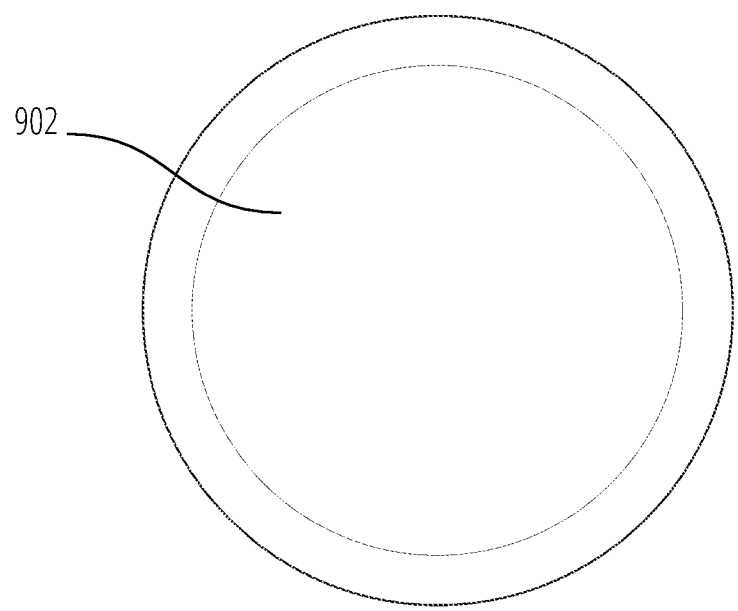
FIG. 10 is a top view of the head of the spike.
Figure 11:
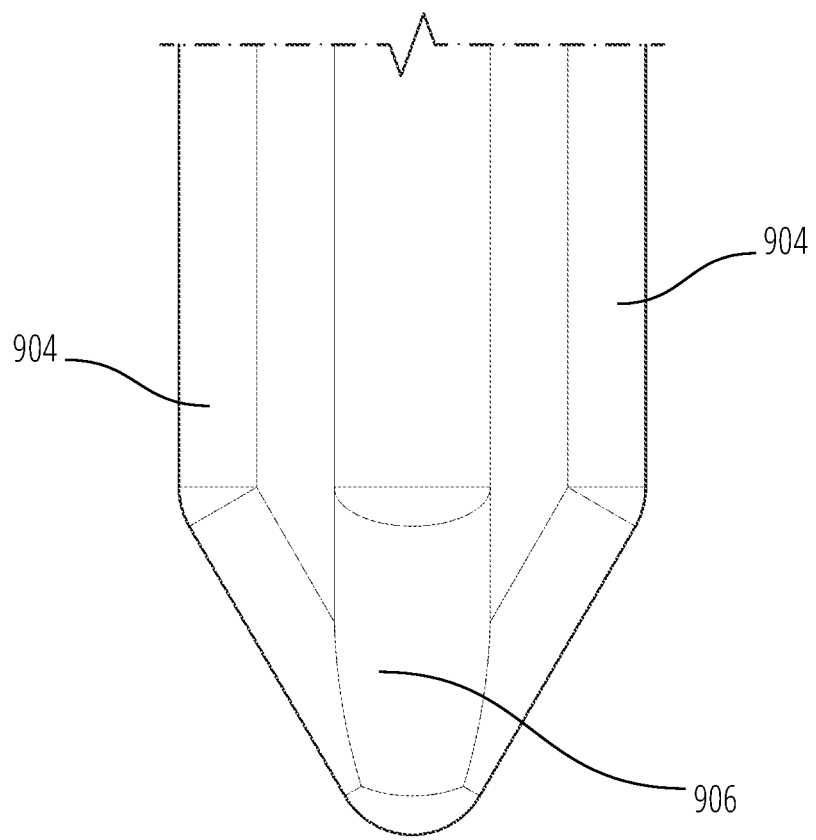
FIG. 11 is an enlarged side elevation view of the pointed end of the spike.

FIG. 9-FIG. 11 are the improved spike 900 in accordance with one embodiment for securing a landscape timber 602, or a landscape timber 602 in combination with an adjustable length adapter 100, which will later be discussed. FIG. 9 shows the improved spike 900 comprising a head 902, an elongated body 908, a pointed end 906. The elongated body 908 preferably has a plurality of radially-spaced wings 904 defining a polygonal cross-section. In a preferred embodiment, the elongated body 908 has four equally-radially-spaced wings 904 forming a rounded cross-section but it will be appreciated more wings 904 can be added. At least three radially spaced wings 904 are preferred for structural rigidity. When the spike 900 is nailed through into the ground, the wings 904 provide structural rigidity and allow the spike 900 to deform around rocks and other solids encountered in the ground. In a preferred embodiment, the spike 900 is molded from plastic but it will be appreciated that the spike 900 can be composed of other flexible materials.

The length of the improved spike 900 ranges from one to three and a half feet long and three-quarters of an inch in diameter. But it will be appreciated that spike 900 may have different dimensions in other embodiments.

The head 902 is shown in greater detail in FIG. 10. The head 902 is meant to be hammered by an operator to drive the spike 900 into the ground. The head 902 can be substantially circular and flat, as shown, or dome shaped. In a preferred embodiment the head 902 is flat. The head 902 is preferably molded to the elongated body 908 of the spike 900 and of the same plastic. The head 902 is preferably 1.5 inches in diameter. But it will be appreciated the head 902 may have different dimensions in other embodiments.

FIG. 11 depicts the wings 904 converging to a point, forming a pointed end 906. The wings 904 increase the strength of the pointed end 906. The pointed end 906 is sufficiently strong to not dull when being hammered into the earth.

Figure 12:
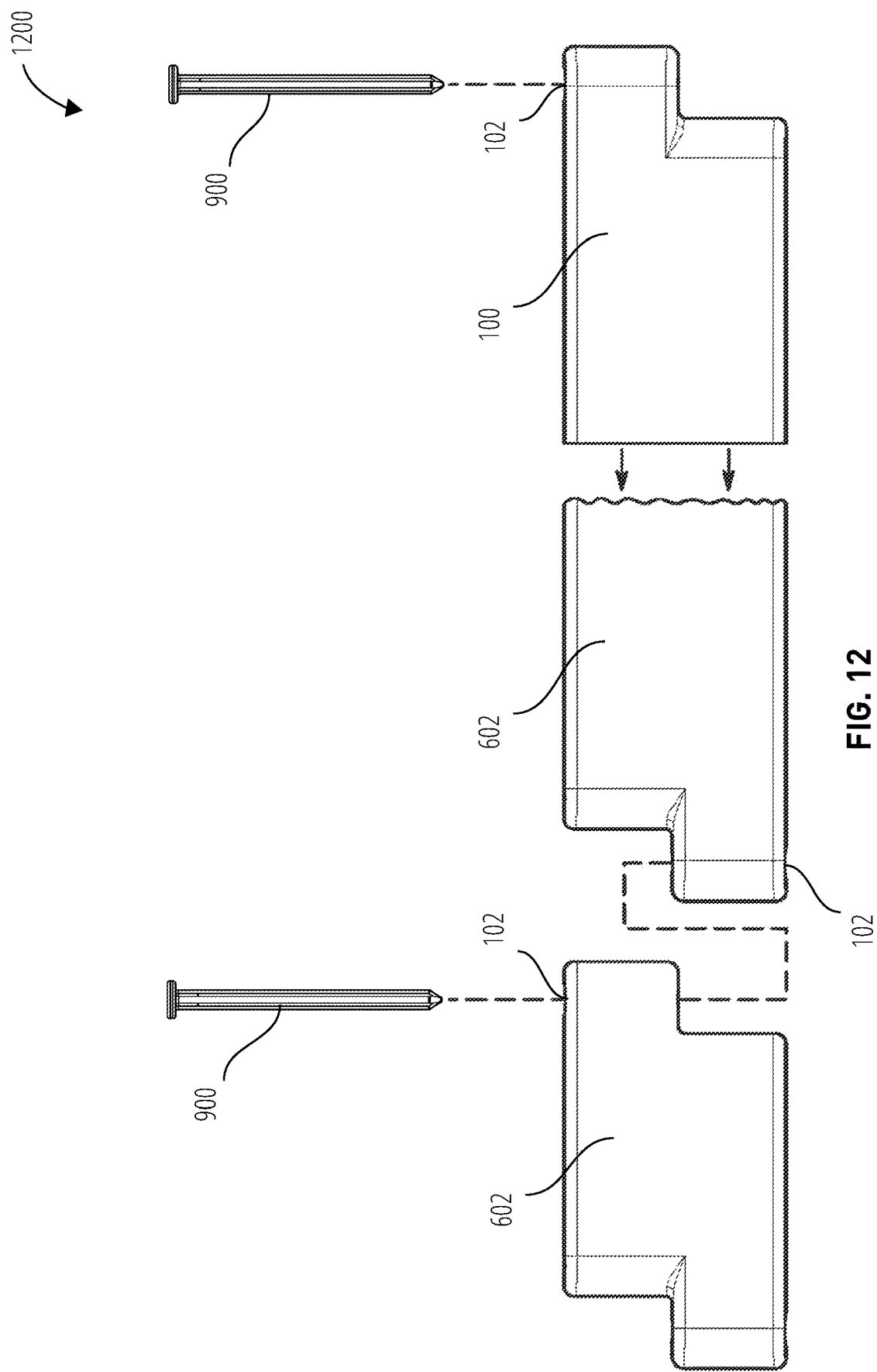
FIG. 12 is an exploded view of the improved system for a landscape timber, depicting a landscape timber, a cut landscape timber, the adjustable length adapter, and spikes for securing the system.

FIG. 12 generally depicts the improved landscape timber system 1200 including a landscape timber 602, a cut landscape timber 602, an adjustable length adapter 100, and spikes 900. The stepped portion of the adjustable length adapter 100 is used to attach to other landscape timbers 602.

Spikes 900 are hammered through the apertures 102 and are used to secure the improved landscape timbers in place.

It will be appreciated that an opening is thus left between a wall and the landscape timber 602, which is aesthetically undesirable. This gap between the wall and landscape timber could allow a surfacing material to escape. The projection 104 in a combined top-step and bottom-step position can be used to create the appearance of a non-stepped end.

The improved spike 900 is an alternative to replace steel spikes commonly used in the industry for its comparable strength, reduced weight, and increased flexibility. The adjustable length adapter 100 provides a better solution to adjusting the length of a landscape timber 602. Unlike prior art, the adjustable length adapter 100 allows for a landscape timber 602 to be elongated or shortened and reduces or simplifies steps.

Another use of the adapter 100 is addressing instances where the final pieces of a section do not have the right alignment of end projections. Recall that the landscape timbers 602 typically have projections 104 at opposing ends, one of which engages the ground in an installed position, and one of which is above the ground. In such a circumstance, for example where the final pieces meet with both projections 104 above the ground, in a top-step position, the adapter 100 can be used to change the orientation of the projections 104 so that the adjacent landscape timbers 602 properly engage one another.

Although the present invention has been described in considerable detail with reference to certain preferred versions thereof, other versions are possible. The spirit and scope of the appended claims should not be limited to the description of the preferred versions contained herein. Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

Having thus described the invention, we claim:

1. A plurality of landscape timbers, each landscape timber having at each end thereof, offset projections adapted to alternatively engage cooperating projections from an adjacent landscape timber, each projection defining an aperture therethrough:
   a) a spike having a head and an elongated body, adapted to pass through adjacent cooperating landscape timber ends and into a ground; and
   b) an adjustable length adapter comprising a length less than each landscape timber, an open end adapted to securely and slidingly receive an end of a single landscape timber, and an opposite end defining a projection, the projection comprising an aperture therethrough.

2. The landscape timber system of claim 1, said spike is composed of a polymer and defines a plurality of radially-spaced wings defining a polygonal cross-section.

3. The landscape timber system of claim 2, said head is selected from flat and dome-shaped.

4. The landscape timber system of claim 2, said spike comprising four radially spaced recessed wings.

5. A landscape timber system comprising:
   a plurality of landscape timbers, each landscape timer having at each end thereof, offset projections adapted to alternatively engage cooperating projections from an adjacent landscape timber, each projection defining an aperture therethrough;
   a) an adjustable length adapter comprising:
      a length less than each landscape timber,
      an open end adapted to securely and slidingly receive an end of the landscape timber, and
      an opposite end defining a projection, the projection comprising an aperture therethrough;
   b) a spike adapted to pass through adjacent cooperating landscape timber ends and into a ground, the spike comprising:
      a plurality of radially spaced recessed wings having radially outward facing surfaces defining a polygonal configuration in horizontal cross-section,
      a first end having a head affixed thereto, and
      an opposite end with the radially outward facing surfaces thereof converging toward a common point defining a pointed end.

* * * * *